United States Patent
Stanton et al.

(10) Patent No.: US 10,649,766 B2
(45) Date of Patent: *May 12, 2020

(54) DYNAMIC REPLACEMENT OF SOFTWARE COMPONENTS

(71) Applicant: Unisys Corporation, Blue Bell, PA (US)

(72) Inventors: Michael F Stanton, Lino Lakes, MN (US); Brian L McElmurry, Roseville, PA (US); Murray D Wilke, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 7 days.

This patent is subject to a terminal disclaimer.

(21) Appl. No.: 14/732,063

(22) Filed: Jun. 5, 2015

(65) Prior Publication Data

US 2016/0357543 A1    Dec. 8, 2016

(51) Int. Cl.
G06F 8/70 (2018.01)
G06F 8/656 (2018.01)
G06F 8/61 (2018.01)
G06F 9/54 (2006.01)

(52) U.S. Cl.
CPC .............. G06F 8/70 (2013.01); G06F 8/61 (2013.01); G06F 8/656 (2018.02); G06F 9/546 (2013.01)

(58) Field of Classification Search
CPC ..... G06F 8/60; G06F 8/65; G06F 8/70; G06F 9/546

See application file for complete search history.

(56) References Cited

U.S. PATENT DOCUMENTS

| | | | | | |
|---|---|---|---|---|---|
| 5,220,653 | A | * | 6/1993 | Miro | G06F 3/0601 718/107 |
| 5,961,623 | A | * | 10/1999 | James | G06F 13/4036 710/107 |
| 6,449,614 | B1 | * | 9/2002 | Marcotte | G06F 9/526 |
| 8,291,434 | B1 | * | 10/2012 | Holzer | G06F 8/67 719/318 |
| 8,739,151 | B1 | * | 5/2014 | Racz | G06F 8/67 717/168 |
| 8,782,632 | B1 | * | 7/2014 | Chigurapati | G06F 8/65 717/168 |
| 2002/0078186 | A1 | * | 6/2002 | Engel | G06F 8/61 709/220 |
| 2003/0182414 | A1 | * | 9/2003 | O'Neill | G06F 8/65 709/223 |

(Continued)

*Primary Examiner* — Viva Miller

(57) ABSTRACT

A non-stop multi-host transaction processing environment may be created by receiving incoming user calls to components through a vestibule bank, and by utilizing an installation manager during the replacement of software. The installation manager may be used in connection with a vestibule bank to handle user calls during the installation of a replacement software component such that user calls for a component can be processed while that component is being replaced, without an error being passed back to the end user. During the replacement of a software component, user calls from the old component may be drained and diverted to a replacement component. User calls received during the installation may be queued and then routed to the replacement component once the component has been replaced.

19 Claims, 7 Drawing Sheets

(56) References Cited

U.S. PATENT DOCUMENTS

2003/0188300 A1* 10/2003 Patrudu ................ G06F 9/4881
717/149
2011/0099266 A1* 4/2011 Calder ..................... G06F 8/65
709/224

* cited by examiner

DYNAMIC REPLACEMENT OF SOFTWARE COMPONENTS

FIELD OF THE DISCLOSURE

The instant disclosure relates to software environments. More specifically, this disclosure relates to dynamically replacing software components in a multi-host transaction processing environment.

BACKGROUND

In a transaction processing environment, installing software is often lengthy, complex, and error prone. The complexity and difficulties increase when the software is installed in an environment with shared storage or a multiple host environment. Such complexities cause significant loss of production capacity during software installation. In such a complex software environment, there is no mechanism that allows for consistent, reliable, verifiable, and resilient software management and installation. When complexities like shared storage and multiple hosts are introduced, software environments are not capable of functioning "non-stop," meaning they cannot present a level of service from hardware and software with no interruption perceptible to the transaction system end user.

Particular components in a multi-host environment cannot be replaced without taking down the entire system. For example, several copies of a database manager may be running on different hosts, and each copy may use the same shared control file. This shared file must be open and accessible for each copy of the database manager to access it. To update a single copy of the database manager, a lock would have to be put on the shared file during the update. While updating this copy of the database manager, the other copies of the database manager running on other hosts cannot access the shared control file. The conflict with the shared control file in this example, or other conflicts that may arise, may cause some of the database managers to stop processing data, resulting in downtime that affects end users of those database managers.

SUMMARY

A non-stop multi-host transaction processing environment may be created by utilizing an installation manager and a vestibule bank for the replacement of software in the environment. The installation manager and vestibule bank may handle user calls during the installation of replacement software such that user calls for a component can be processed while that component is being replaced, without an error being passed back to the end user. During the replacement of a software component, calls in a queue for the old component may be drained from the old component queue and diverted to a replacement component. User calls received during the installation may be queued and then routed to the replacement component once the component has been replaced.

According to one embodiment of the invention, a method may include staging, by an installation manager executing on a processor separate from a component, a replacement component to replace the component. The method may also include draining, by the installation manager executing on the processor in cooperation with an agent in the component, one or more first user calls from the component, and diverting the one or more first user calls to the replacement component. The method may further include queueing, by the installation manager executing on the processor in cooperation with the agent in the component, one or more second user calls for the component while the one or more first user calls are being drained from the component. The method may also include routing, by the installation manager executing on the processor, upon completion of draining the one or more first user calls from the component, the queued one or more second user calls for the component to the replacement component.

According to another embodiment, a computer program product may include a non-transitory computer readable medium comprising instructions which, when executed by a processor of a computing system, cause the processor to perform the steps of staging, by an installation manager executing on the processor separate from a component, a replacement component to replace the component. The medium may also include instructions which, when executed by the processor, cause the processor to perform the steps of draining, by the installation manager executing on the processor in cooperation with an agent in the component, one or more first user calls from the component, and diverting the one or more first user calls to the replacement component. The medium may further include instructions which, when executed by the processor, cause the processor to perform the steps of queueing, by the installation manager executing on the processor in cooperation with the agent in the component, one or more second user calls for the component while the one or more first user calls are being drained from the component. The medium may also include instructions which, when executed by the processor, cause the processor to perform the steps of routing, by the installation manager executing on the processor, upon completion of draining the one or more first user calls from the component, the queued one or more second user calls for the component to the replacement component.

According to a yet another embodiment, an apparatus may include a memory, and a processor coupled to the memory. The processor may be configured to execute the steps of staging, by an installation manager executing on the processor separate from a component, a replacement component to replace the component. The processor may also be configured to execute the steps of draining, by the installation manager executing on the processor in cooperation with an agent in the component, one or more first user calls from the component, and diverting the one or more first user calls to the replacement component. The processor may further be configured to execute the steps of queueing, by the installation manager executing on the processor in cooperation with the agent in the component, one or more second user calls for the component while the one or more first user calls are being drained from the component. The processor may also be configured to execute the steps of routing, by the installation manager executing on the processor, upon completion of draining the one or more first user calls from the component, the queued one or more second user calls for the component to the replacement component.

According to one embodiment of the invention, a method may include receiving, by a processor, at a vestibule bank, one or more user calls for a component while the component is being replaced by a replacement component. The method may also include transferring, by the processor, control of the one or more user calls at the vestibule bank to an installation management routines subsystem. The method may further include queueing, by the processor, the one or more user calls while the component is being replaced. The method may also include routing, by the processor, the one or more queued user calls to the replacement component upon completion of the replacement of the component.

According to another embodiment, a computer program product may include a non-transitory computer readable medium comprising instructions which, when executed by a processor of a computing system, cause the processor to perform the steps of receiving at a vestibule bank, one or more user calls for a component while the component is being replaced by a replacement component. The medium may also include instructions which, when executed by the processor, cause the processor to perform the steps of transferring control of the one or more user calls at the vestibule bank to an installation management routines subsystem. The medium may further include instructions which, when executed by the processor, cause the processor to perform the steps of queueing the one or more user calls while the component is being replaced. The medium may also include instructions which, when executed by the processor, cause the processor to perform the steps of routing the one or more queued user calls to the replacement component upon completion of the replacement of the component.

According to a yet another embodiment, an apparatus may include a memory, and a processor coupled to the memory. The processor may be configured to execute the steps of receiving at a vestibule bank, one or more user calls for a component while the component is being replaced by a replacement component. The processor may also be configured to execute the steps of transferring control of the one or more user calls at the vestibule bank to an installation management routines subsystem. The processor may further be configured to execute the steps of queueing the one or more user calls while the component is being replaced. The processor may also be configured to execute the steps of routing the one or more queued user calls to the replacement component upon completion of the replacement of the component.

According to one embodiment of the invention, a method may include receiving, by a processor, at a vestibule bank, an installation manager call for replacement of a component. The method may also include routing, by the processor, the installation manager call from the vestibule bank to the component. The method may further include draining, by the processor, one or more first user calls from the component, and diverting the one or more first user calls to the replacement component. The method may also include queueing, by the processor, one or more second user calls for the component while the one or more first user calls are being drained from the component. The method may further include routing, by the processor, the one or more second user calls to a replacement component upon completion of draining the one or more first user calls from the component.

According to another embodiment, a computer program product may include a non-transitory computer readable medium comprising instructions which, when executed by a processor of a computing system, cause the processor to perform the steps of receiving at a vestibule bank, an installation manager call for replacement of a component. The medium may also include instructions which, when executed by the processor, cause the processor to perform the steps of routing the installation manager call from the vestibule bank to the component. The medium may further include instructions which, when executed by the processor, cause the processor to perform the steps of draining one or more first user calls from the component, and diverting the one or more first user calls to the replacement component. The medium may also include instructions which, when executed by the processor, cause the processor to perform the steps of queueing one or more second user calls for the component while the one or more first user calls are being drained from the component. The medium may further include instructions which, when executed by the processor, cause the processor to perform the steps of routing the one or more second user calls to a replacement component upon completion of draining the one or more first user calls from the component.

According to a yet another embodiment, an apparatus may include a memory, and a processor coupled to the memory. The processor may be configured to execute the steps of receiving at a vestibule bank, an installation manager call for replacement of a component. The processor may also be configured to execute the steps of routing the installation manager call from the vestibule bank to the component. The processor may further be configured to execute the steps of draining one or more first user calls from the component, and diverting the one or more first user calls to the replacement component. The processor may also be configured to execute the steps of queueing one or more second user calls for the component while the one or more first user calls are being drained from the component. The processor may further be configured to execute the steps of routing the one or more second user calls to a replacement component upon completion of draining the one or more first user calls from the component.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
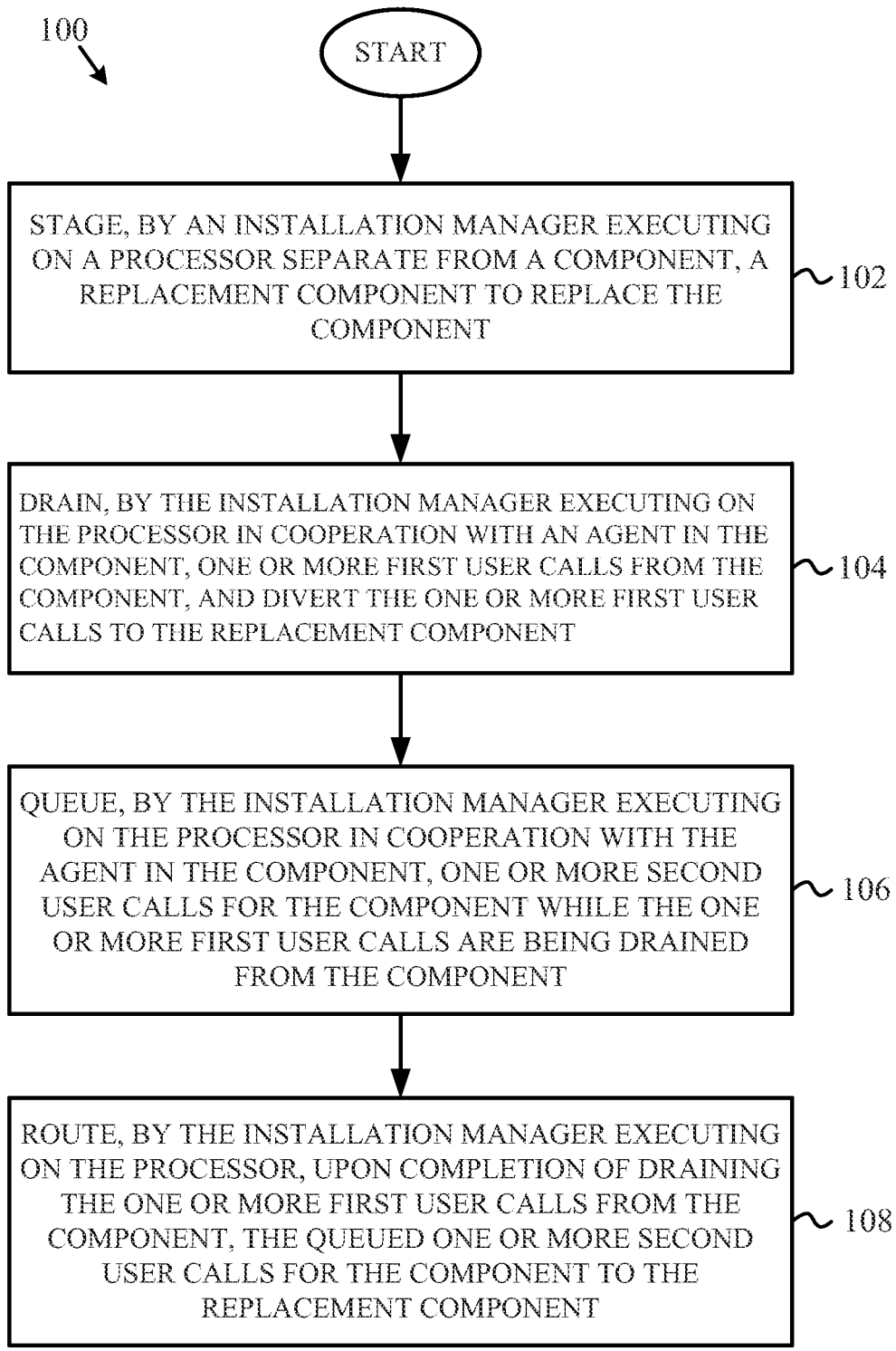
FIG. 1 is a flow chart illustrating a method for replacing software in a non-stop multi-host transaction processing environment, according to one embodiment of the disclosure.

FIG. 1 is a flow chart illustrating a method for replacing software in a non-stop multi-host transaction processing environment, according to one embodiment of the disclosure. This method may be used for the migration of a software component, wherein migration is the action of changing from one product or set of products to another, including movement between released levels of a product. A method 100 may start at block 102 by staging, by an installation manager executing on a processor separate from a component, a replacement component to replace the component. The component may be a software product supplied by a customer or a vendor. The component may optionally be composed of multiple subsystems or executable program modules. The staging of the replacement component may include installing the replacement component into the environment, and building any control structures for the replacement component. At block 104, the method may include draining, by the installation manager executing on the processor in cooperation with an agent in the component, one or more first user calls from the component, and diverting the one or more first user calls to the replacement component. Draining may occur after the replacement component flags readiness to accept new user calls. Draining may include emptying the first user calls from the component queue. The first user calls drained from the component may be passed from the component through a private gate between the component and the replacement component.

At block 106, the method may include queueing, by the installation manager executing on the processor in cooperation with the agent in the component, one or more second user calls for the component while the one or more first user calls are being drained from the component. The one or more second user calls for the component may be received at a vestibule bank before they are queued. Queueing may not occur until after the replacement component flags readiness to accept new user calls. At block 108, the method may include routing, by the installation manager executing on the processor, upon completion of draining the one or more first user calls from the component, the queued one or more second user calls for the component to the replacement component. By queueing incoming user calls during replacement of the component, and then releasing the queued user calls to the replacement component once installation of the replacement component is complete, a non-stop environment may be created. A non-stop environment may be an environment which presents a level of service from hardware and software with no interruption perceptible to the transaction system end user.

Figure 2:
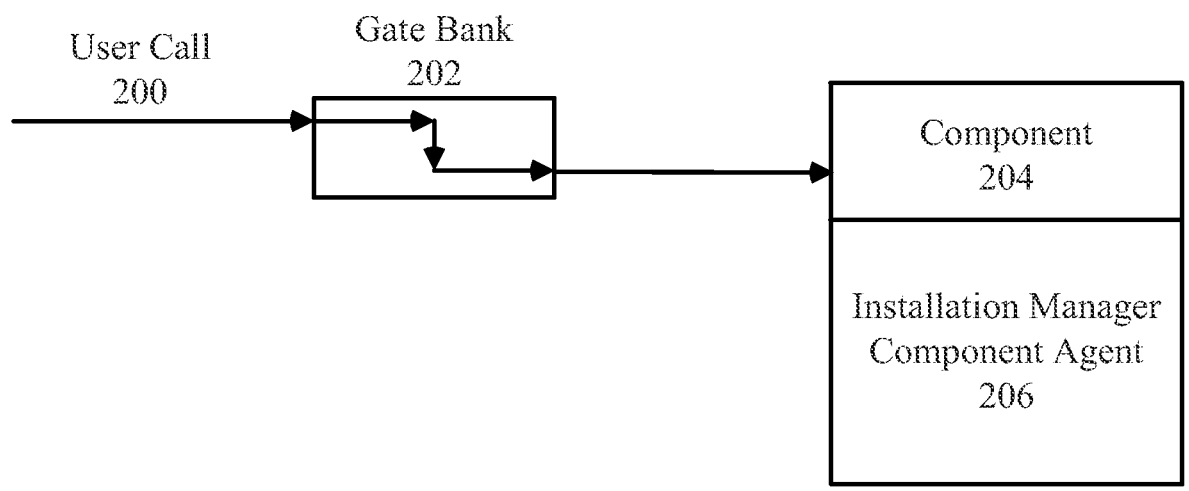
FIG. 2 is a block diagram illustrating processing a user call to a component before replacement, according to one embodiment of the disclosure.

FIG. 2 is a block diagram illustrating processing a user call 200 to a component 204 before replacement, according to one embodiment of the disclosure. The user call 200 may be received at a gate bank 202. The gate bank 202 may route the user call to the component 204. The component 204 may then process the user call 200, without any pause in processing the caller transaction. The component 204 may have an installation manager component agent 206 for the event that the component 204 needs to be replaced. The installation manager component agent 206 may provide component 204 specific intercepts to the system global installation manager 300 in FIG. 3. The installation manager component agent 206 may sit unexecuted as a subcomponent of the software component 204 until called by a user for purposes of reinstalling the component 204.

Figure 3:
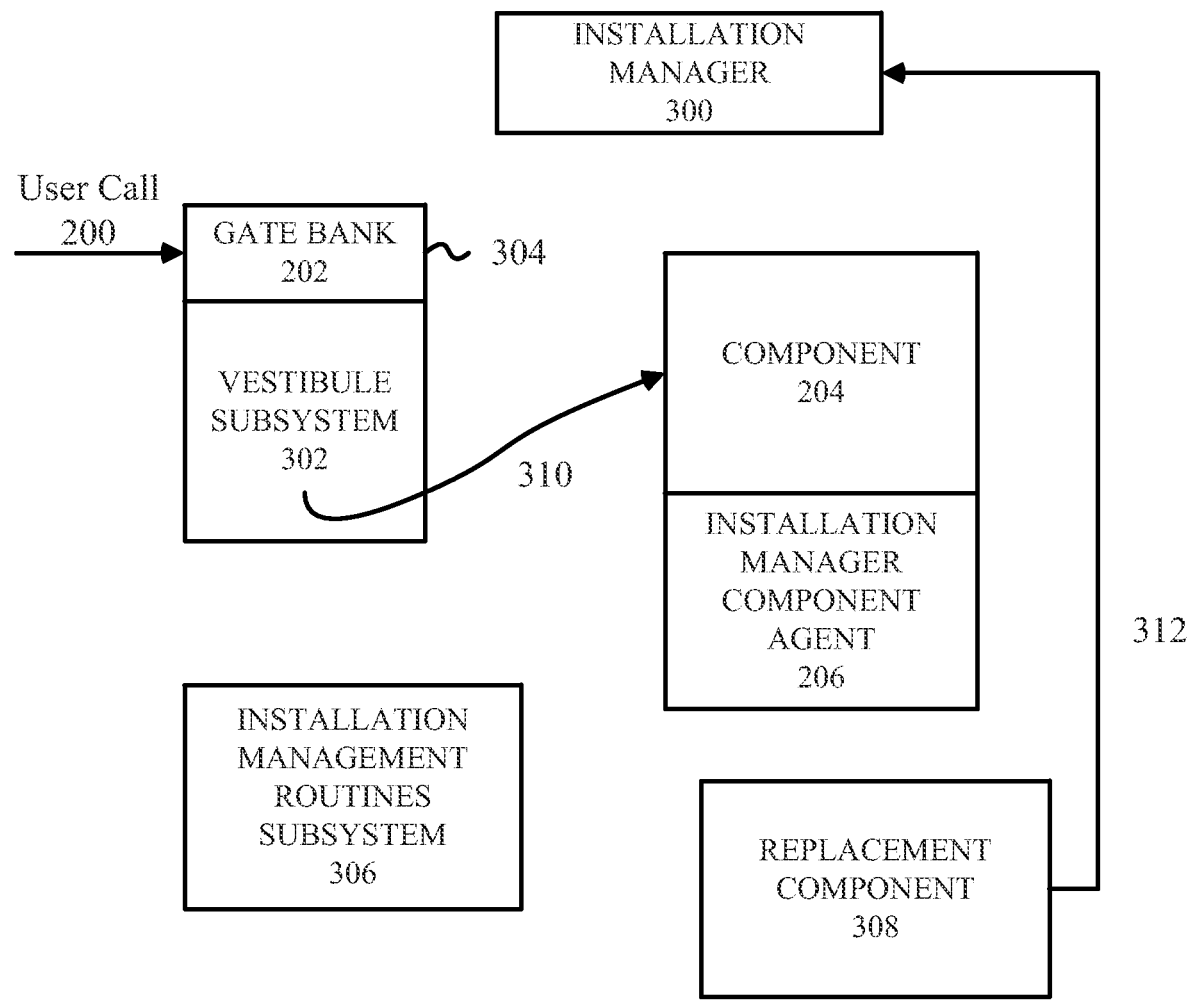
FIG. 3 is a block diagram illustrating processing a user call to a component while a replacement component is being staged, according to one embodiment of the disclosure.

FIG. 3 is a block diagram illustrating processing a user call 200 to a component 204 while a replacement component 308 is being staged, according to one embodiment of the disclosure. The user call 200 to a component 204 in a multi-host transaction processing environment may be received at a vestibule bank 304, which may include a standard gate bank 202, and may also include a vestibule subsystem 302. The vestibule subsystem 302 may provide a transition point into a protected subsystem, such as an installation management routines subsystem 306. The vestibule subsystem 302 may be a collection of software units that collectively serve as a transition point into a protected system by routing the incoming user calls.

An installation manager 300 may be installed in the multi-host transaction processing environment. The installation manager 300 may be a system global subsystem installation manager, accessible from multiple component 204 installations via the installation manager component agent 206 associated with the component 204. The installation manager 300 may be a set of administrator and program interfaces defined for the purpose of managing the installation of software in a Portable Operating System Interface (POSIX) environment. The installation manager 300 may activate an installation management routines subsystem 306 that provides a plurality of installation manager system services. The installation management routines subsystem 306 may be a collection of software units that collectively handle user calls and facilitate the installation of new components in a multi-host transaction processing environment. The installation manager system services provided by the installation management routines subsystem 306 may include activation of the replacement component 308, queueing user calls (such as described with reference to FIG. 1), and synchronizing components with the installation management routines sub 306. The installation management routines subsystem 306 may support user calls from the vestibule subsystem 302 when the replacement of a component is triggered.

The replacement component 308 may be staged in memory alongside the component 204. The replacement component 308 may be loaded from its install files and may perform component initialization procedures, such as by building support control structures. While the replacement component 308 is being staged, a user call 200 to the component 204 may be routed 310 by the vestibule bank 304 to the component 204. Upon completion of the installation of the replacement component 308, the replacement component 308 may flag 312 to the installation manager 300 readiness to accept user calls.

Figure 4:
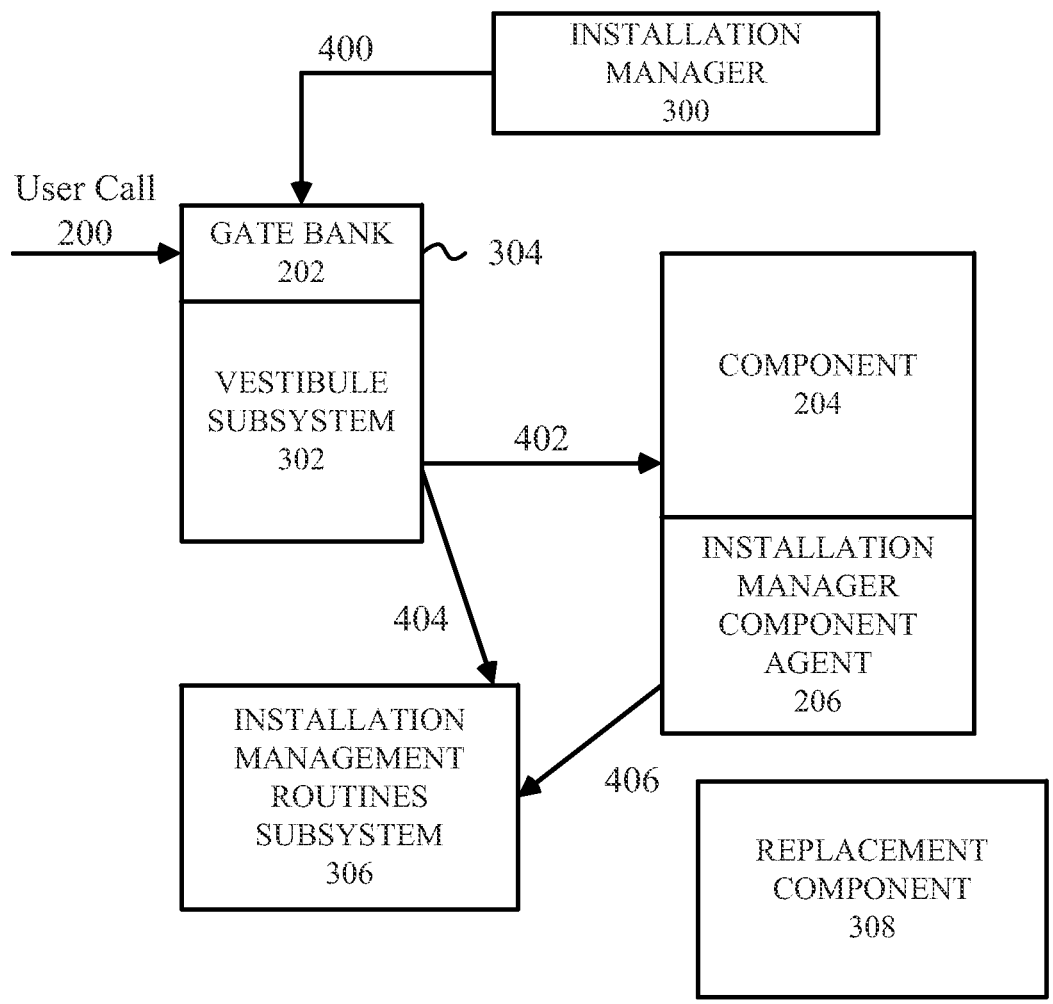
FIG. 4 is a block diagram illustrating processing a user call to a component when replacement of that component is triggered, according to one embodiment of the disclosure.

FIG. 4 is a block diagram illustrating processing a user call 200 to a component 204 when replacement of the component 204 is triggered, according to one embodiment of the disclosure. Once a replacement component 308 is loaded and staged, the replacement component 308 may flag readiness to accept user calls, and then replacement of the component 204 may be triggered by the installation manager 300. The installation manager 300 may call 400 the vestibule bank 304 to trigger the replacement of the component 204. The vestibule bank 304 may grant permission for the installation manager call 400 to access the component 204, and may route 402 the installation manager call 400 to the component 204. The installation manager call 400 may enter the component 204 and initiate draining of any user calls from the component 204. Once all user calls from the component 204 have been drained, the installation manager component agent 206 may flag 406 to the installation management routines subsystem 306 that all user calls from the component 204 have been drained. The installation manager component agent 206 may serve as an interface between the component 204 and the installation management routines subsystem 306, to allow for synchronization between the component 204 and the installation management routines subsystem 306.

During replacement, the triggering of the replacement component 308 may transfer control of the user calls for the component 204 to the installation management routines subsystem 306. A user call 200 for the component 204 during replacement may be routed 404 by the vestibule bank 304 to the installation management routines subsystem 306. The user call 200 may be queued by the installation management routines subsystem 306 until installation of the replacement component 308 is complete or aborted.

Figure 5:
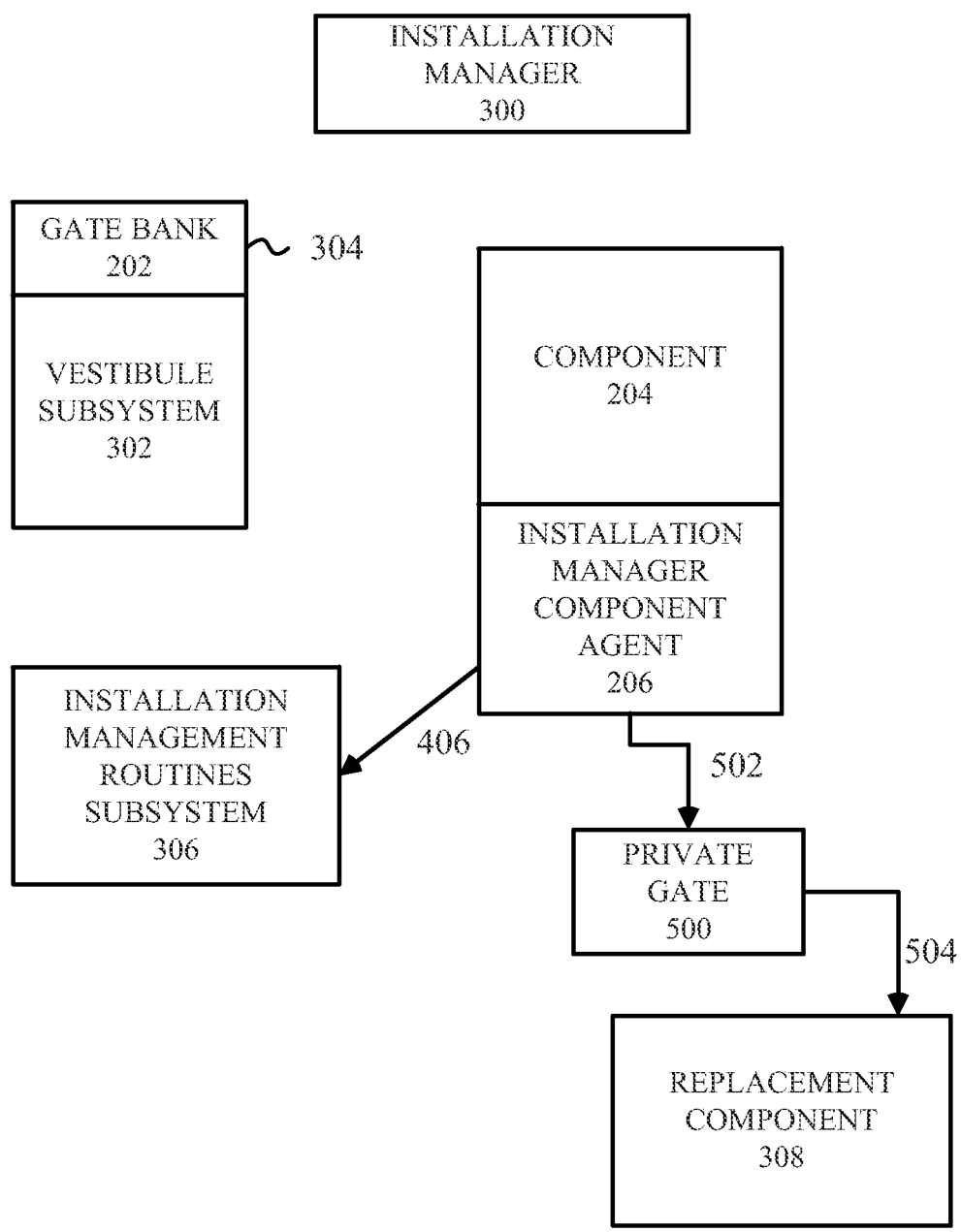
FIG. 5 is a block diagram illustrating replacement of a component by draining user calls from the component and diverting the user calls from the component to a replacement component, according to one embodiment of the disclosure.

FIG. 5 is a block diagram illustrating replacement of a component 204 by draining user calls from the component 204 and diverting the user calls from the component 204 to a replacement component 308, according to one embodiment of the disclosure. The user calls from the component 204 may be drained from the component 204, and may call 502 a private gate 500 to gain access to the replacement component 308. The user calls from the component 204 may then be passed through the private gate 500. The private gate 500 may be a transition point, controlling access into the replacement component 308, and routing calls to the replacement component 308. The calls may be diverted 504 from the private gate 500 to the replacement component 308. Once all calls from the component 204 are drained and diverted 504 to the replacement component 308, the component 204 has been replaced, and activation of the replacement component 308 may proceed. Activation may be the process or procedure by which a component, such as replacement component 308, is made available to users for calls. The installation manager component agent 206 may flag 406 to the installation management routines subsystem 306 that all calls from the component 204 have been drained, and new user calls for the component 204 should be routed to the replacement component 308.

Figure 6:
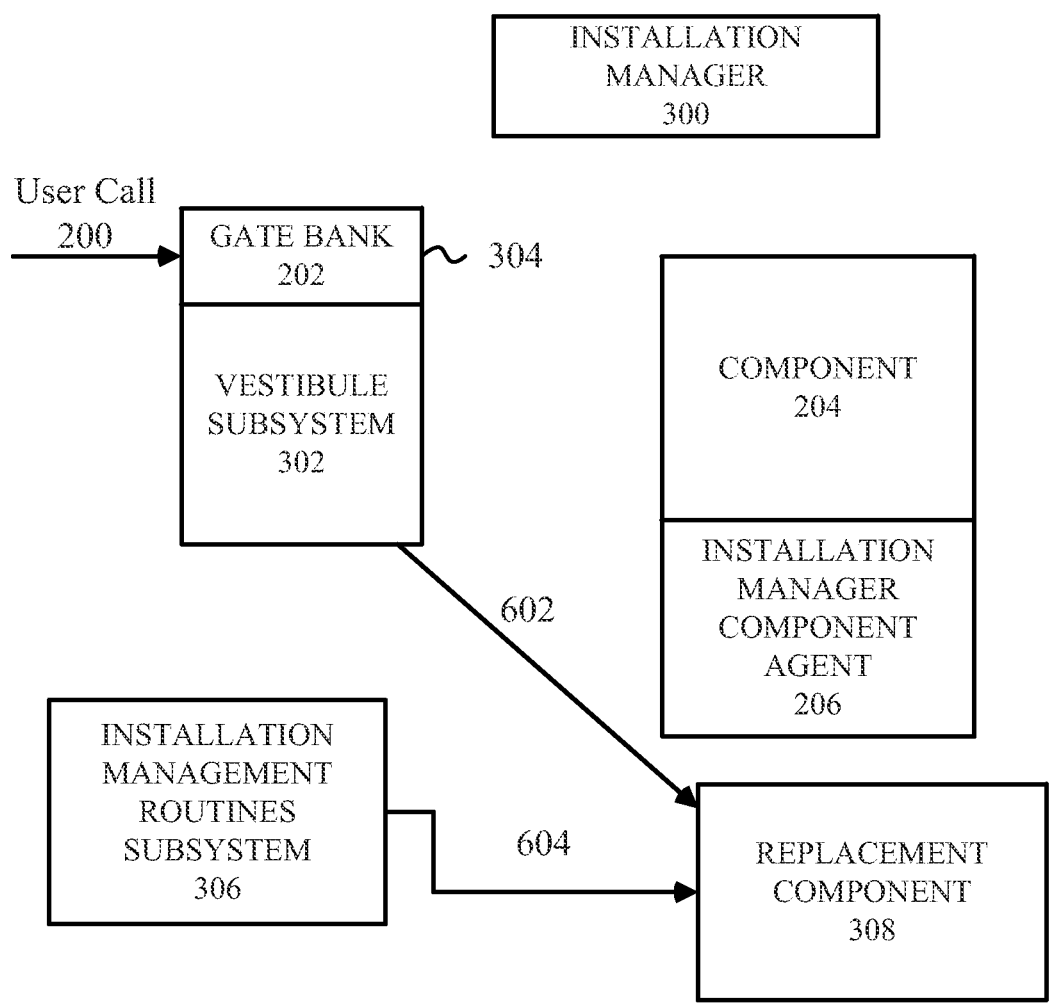
FIG. 6 is a block diagram illustrating processing a user call to a component after the component has been replaced by a replacement component, according to one embodiment of the disclosure.

FIG. 6 is a block diagram illustrating processing a user call 200 to a component 204 after the component 204 has been replaced by a replacement component 308, according to one embodiment of the disclosure. Users that have been queued by the installation routines subsystem 306 during replacement may be released and routed 604 to the replacement component 308. Some or all new user calls 200 to the component 204 at this point may be routed 602 from the vestibule bank 304 to the replacement component 308. All banks that compose the old component subsystem may be deleted, and the transition to the replacement component 308 may be marked as complete.

Figure 7:
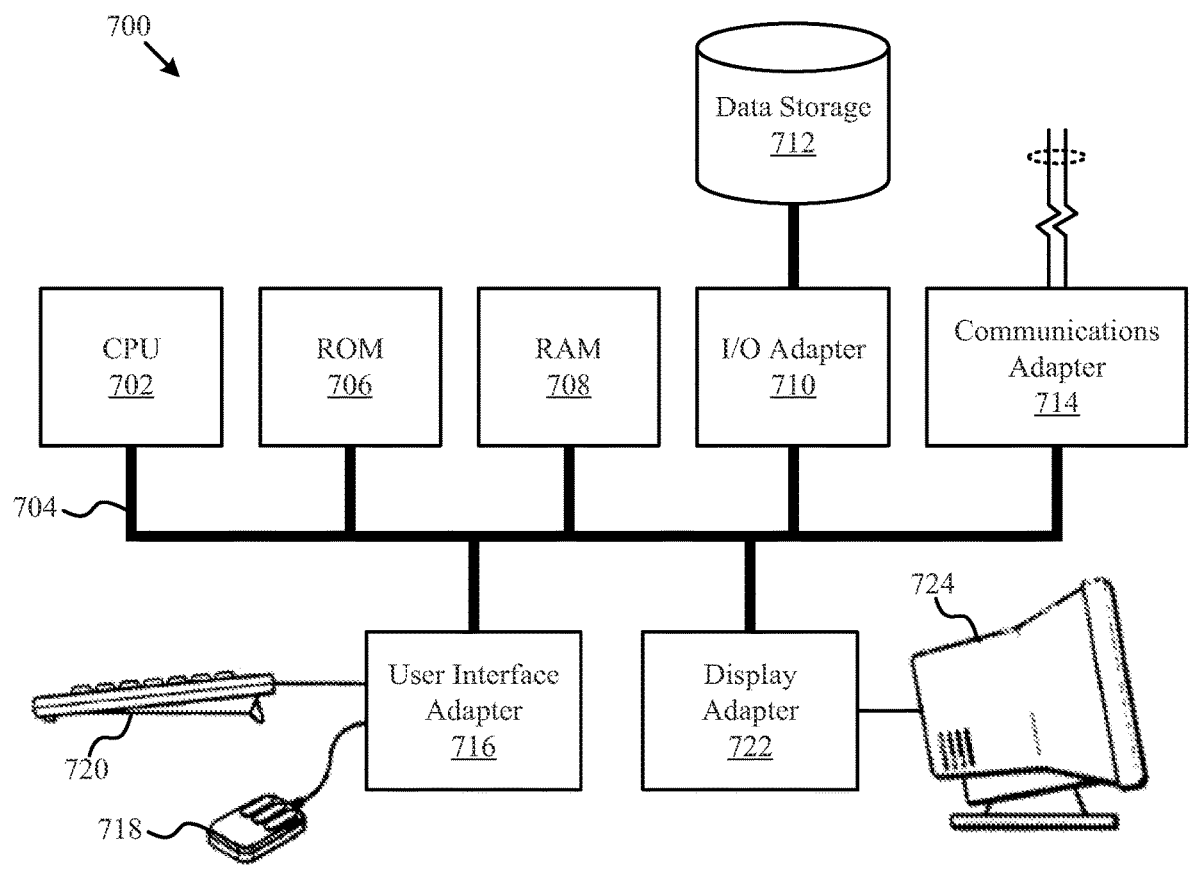
FIG. 7 is a block diagram illustrating a computer system for implementing embodiments of the disclosure, according to one embodiment of the disclosure.

FIG. 7 illustrates a computer system 700 adapted according to certain embodiments of a server and/or a user interface device for implementing embodiments of the disclosure, according to one embodiment of the disclosure. For example, computer system 700 may implement each of the embodiments illustrated in FIGS. 1-6. The central processing unit ("CPU") 702 is coupled to the system bus 704. The CPU 702 may be a general purpose CPU or microprocessor, graphics processing unit ("GPU"), and/or microcontroller. The present embodiments are not restricted by the architecture of the CPU 702 so long as the CPU 702, whether directly or indirectly, supports the operations described herein. The CPU 702 may execute the various logical instructions according to the present embodiments.

The computer system 700 may also include random access memory (RAM) 708, which may be synchronous RAM (SRAM), dynamic RAM (DRAM), synchronous dynamic RAM (SDRAM), or the like. The computer system 700 may utilize RAM 708 to store the various data structures used by a software application. The computer system 700 may also include read only memory (ROM) 706 which may be PROM, EPROM, EEPROM, optical storage, or the like. The ROM may store configuration information for booting the computer system 700. The RAM 708 and the ROM 706 hold user and system data, and both the RAM 708 and the ROM 706 may be randomly accessed.

The computer system 700 may also include an input/output (I/O) adapter 710, a communications adapter 714, a user interface adapter 716, and a display adapter 722. The I/O adapter 710 and/or the user interface adapter 716 may, in certain embodiments, enable a user to interact with the computer system 700. In a further embodiment, the display adapter 722 may display a graphical user interface (GUI) associated with a software or web-based application on a display device 724, such as a monitor or touch screen.

The I/O adapter 710 may couple one or more storage devices 712, such as one or more of a hard drive, a solid state storage device, a flash drive, a compact disc (CD) drive, a floppy disk drive, and a tape drive, to the computer system 700. According to one embodiment, the data storage 712 may be a separate server coupled to the computer system 700 through a network connection to the I/O adapter 710. The communications adapter 714 may be adapted to couple the computer system 700 to a network, which may be one or more of a LAN, WAN, and/or the Internet. The user interface adapter 716 couples user input devices, such as a keyboard 720, a pointing device 718, and/or a touch screen (not shown) to the computer system 700. The display adapter 722 may be driven by the CPU 702 to control the display on the display device 724. Any of the devices 702-722 may be physical and/or logical.

The applications of the present disclosure are not limited to the architecture of computer system 700. Rather the computer system 700 is provided as an example of one type of computing device that may be adapted to perform the functions of a server and/or the user interface device 710. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, in some embodiments, aspects of the computer system 700 may be virtualized for access by multiple users and/or applications.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   receiving, by a processor of a vestibule bank, an installation manager call for replacement of a component;
   routing, by the processor, the installation manager call from the vestibule bank to the component;
   draining, by the processor, one or more first user calls from a first queue of the component, and diverting the one or more first user calls to a replacement component via a private gate separate from the vestibule bank;
   queueing, by the processor, in a second queue different from the first queue, one or more second user calls for the component while the one or more first user calls are being drained from the component; and
   routing, by the processor, the one or more second user calls in the second queue to the replacement component via the private gate upon completion of draining the one or more first user calls from the component;
   wherein the vestibule bank provides a transition point into a protected subsystem, and comprises a collection of software units that collectively serve as a transition point into a protected system by routing incoming user calls including the one or more first user calls and the one or more second user calls to the component and routing subsequent user calls to the replacement component.

2. The method of claim 1, in which the installation manager activates an installation management routines subsystem that provides a plurality of installation manager system services.

3. The method of claim 2, in which one of the plurality of installation manager system services is a service for queueing of the one more second user calls.

4. The method of claim 2, in which one of the plurality of installation manager system services is a service for activation of the replacement component.

5. The method of claim 2, further comprising:
   interfacing between the installation manager routines subsystem and an installation manager component agent in the component or the replacement component.

6. The method of claim 1, in which the steps of draining and queuing occur after the replacement component flags readiness to accept new user calls.

7. A computer program product, comprising:
   a non-transitory computer readable medium comprising code to perform the steps of:
   receiving, by a processor of a vestibule bank, an installation manager call for replacement of a component;
   routing, by the processor, the installation manager call from the vestibule bank to the component;
   draining, by the processor, one or more first user calls from a first queue of the component, and diverting the one or more first user calls to a replacement component via a private gate separate from the vestibule bank;
   queueing, by the processor, in a second queue different from the first queue, one or more second user calls for the component while the one or more first user calls are being drained from the component; and
   routing, by the processor, the one or more second user calls in the second queue via the private gate to the replacement component upon completion of draining the one or more first user calls from the component;
   wherein the vestibule bank provides a transition point into a protected subsystem, and comprises a collection of software units that collectively serve as a transition point into a protected system by routing incoming user calls, including routing the one or more first user calls and the one or more second user calls to the component and routing subsequent user calls to the replacement component.

8. The computer program product of claim 7, in which the installation manager activates an installation management routines subsystem that provides a plurality of installation manager system services.

9. The computer program product of claim 8, in which one of the plurality of installation manager system services is a service for queueing of the one more second user calls.

10. The computer program product of claim 8, in which the medium further comprises code to perform the step of:
    interfacing between the installation manager routines subsystem and an installation manager component agent in the component or the replacement component.

11. The computer program product of claim 7, in which the steps of draining and queuing occur after the replacement component flags readiness to accept new user calls.

12. An apparatus, comprising:
    a memory; and
    a processor coupled to the memory, the processor configured to execute the steps of:
    receiving, by the processor of a vestibule bank, an installation manager call for replacement of a component;
    routing, by the processor, the installation manager call from the vestibule bank to the component;
    draining, by the processor, one or more first user calls from a first queue of the component, and diverting the one or more first user calls to a replacement component via a private gate separate from the vestibule bank;
    queueing, by the processor, in a second queue different from the first queue, one or more second user calls for the component while the one or more first user calls are being drained from the component; and
    routing, by the processor, the one or more second user calls in the second queue via the private gate to the replacement component upon completion of draining the one or more first user calls from the component;
    wherein the vestibule bank provides a transition point into a protected subsystem, and comprises a collection of software units that collectively serve as a transition point into a protected system by routing incoming user calls including the one or more first user calls and the one or more second user calls to the component and routing subsequent user calls to the replacement component.

13. The apparatus of claim 12, in which the installation manager activates an installation management routines subsystem that provides a plurality of installation manager system services.

14. The apparatus of claim 13, in which one of the plurality of installation manager system services is a service for queueing of the one more second user calls.

15. The apparatus of claim 13, in which the processor is farther configured to perform the step of:
    interfacing between the installation manager routines subsystem and an installation manager component agent in the component or the replacement component.

16. The apparatus of claim 12, in which the steps of draining and queuing occur after the replacement component flags readiness to accept new user calls.

17. The method of claim 1, wherein the step of draining includes:
    the private gate receiving the one or more first user calls drained from the first queue of the component, the one or more first user calls being diverted from the private gate to the replacement component, wherein the private gate controls the access of the replacement component.

18. The computer program product of claim 7, wherein the step of draining includes:
    the private gate receiving the one or more first user calls drained from the first queue of the component, the one or more first user calls being diverted from the private gate to the replacement component, wherein the private gate controls the access of the replacement component.

19. The apparatus of claim 12, wherein the step of draining includes:
    the private gate receiving the one or more first user calls drained from the first queue of the component, the one or more first user calls being diverted from the private gate to the replacement component, wherein the private gate controls the access of the replacement component.

* * * * *